United States Patent
Trevino et al.

(10) Patent No.: US 7,234,726 B2
(45) Date of Patent: Jun. 26, 2007

(54) AIRBAG ASSEMBLY FOR IMPROVING FORCE DISTRIBUTION

(75) Inventors: Lisandro Trevino, Ann Arbor, MI (US); Donald James Cvengros, Canton, MI (US); Deepak Nathubhai Patel, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 207 days.

(21) Appl. No.: 11/014,548

(22) Filed: Dec. 16, 2004

(65) Prior Publication Data

US 2006/0131844 A1 Jun. 22, 2006

(51) Int. Cl.
*B60R 21/20* (2006.01)

(52) U.S. Cl. .................. 280/728.3; 280/732

(58) Field of Classification Search ............ 280/730.2, 280/728.1, 728.3, 732
See application file for complete search history.

(56) References Cited

U.S. PATENT DOCUMENTS

| | | | |
|---|---|---|---|
| 4,878,689 A | 11/1989 | Mitzkus et al. | |
| 5,320,381 A * | 6/1994 | Barnes et al. ............ | 280/728.3 |
| 5,362,096 A | 11/1994 | Satoh et al. | |
| 5,429,385 A | 7/1995 | Kamiji et al. | |
| 5,816,609 A * | 10/1998 | Gray et al. ............... | 280/728.3 |
| 5,901,976 A | 5/1999 | Kreuzer et al. | |
| 6,145,871 A | 11/2000 | Davis, Jr. et al. | |
| 6,260,875 B1 | 7/2001 | Stawicki et al. | |
| 6,457,739 B1 * | 10/2002 | Dailey et al. ............ | 280/728.3 |
| 6,565,115 B2 | 5/2003 | Streck | |
| 6,568,705 B2 | 5/2003 | Kinane | |
| 6,568,707 B2 | 5/2003 | Hier et al. | |
| 6,623,029 B2 | 9/2003 | Sun et al. | |
| 6,644,685 B2 | 11/2003 | Sun et al. | |
| 6,742,804 B2 | 6/2004 | Suzuki et al. | |
| 6,773,795 B2 | 8/2004 | Byma et al. | |
| 2002/0005630 A1 * | 1/2002 | Suzuki et al. ............ | 280/728.3 |
| 2002/0117834 A1 | 8/2002 | Hier et al. | |
| 2003/0011178 A1 * | 1/2003 | Choi et al. ............... | 280/732 |
| 2003/0080540 A1 | 5/2003 | Kinane | |
| 2003/0184058 A1 | 10/2003 | Gray et al. | |
| 2003/0184063 A1 | 10/2003 | Yasuda et al. | |
| 2003/0184064 A1 | 10/2003 | Hier et al. | |
| 2004/0026902 A1 | 2/2004 | Yasuda et al. | |
| 2004/0041374 A1 | 3/2004 | Fujii | |
| 2004/0056455 A1 | 3/2004 | Nishijima et al. | |
| 2004/0075251 A1 | 4/2004 | Fujii et al. | |
| 2004/0164525 A1 | 8/2004 | Gray et al. | |
| 2004/0164531 A1 | 8/2004 | Riha et al. | |
| 2004/0174000 A1 | 9/2004 | Speelman et al. | |
| 2004/0183279 A1 | 9/2004 | DePue et al. | |

* cited by examiner

*Primary Examiner*—Paul N. Dickson
*Assistant Examiner*—Tiffany L. Webb
(74) *Attorney, Agent, or Firm*—Brinks Hofer Gilson & Lione (57) ABSTRACT

An airbag assembly for a motor vehicle does not require any heat stakes and permits a deployment door to be formed in the interior panel without the need for scoring or other pre-weakening thereof. The airbag chute is constructed of plastic and includes a substrate facing surface. A door assembly includes a metal door and a plastic door plate. The door plate is positioned between the substrate and the door portion, and has a substrate facing surface. The substrate facing surfaces of the airbag chute and the plastic door plate are attached to the substrate. The substrate facing surface of the plastic door plate engages the substrate over a contact area to distribute a force imposed on the plastic door plate from the deployment of the airbag.

18 Claims, 7 Drawing Sheets

AIRBAG ASSEMBLY FOR IMPROVING FORCE DISTRIBUTION

FIELD OF THE INVENTION

The present invention relates generally to an inflatable restraint apparatus for an automotive vehicle, and more particularly relates to an airbag assembly that is structured to promote cleaner deployment of the airbag through an interior panel of the vehicle.

BACKGROUND OF THE INVENTION

Most modern vehicles include inflatable restraint apparatus having deployable airbags positioned in many locations throughout an automotive vehicle. Generally, an interior panel includes a deployment door formed into the panel which is designed to break free upon deployment of the airbag. A supporting structure behind the interior panel typically contains flexible tethers or metal hinges, which in combination with the deployment door is designed to let the airbag deploy in a very short duration.

A primary aim of the airbag assembly is to control the opening of the deployment door to avoid break explosion and the possibility of flying parts. Clean deployment is provided, in part, through aggressive pre-weakening of the outline of the deployment door to form a seam (typically by laser scoring, mechanical scoring, etc.) in order to insure clean airbag performance. Many airbag assemblies also include ribs formed directly into the substrate of the instrument panel and its deployment door such that the airbag assembly may be directly attached thereto. These ribs are fairly tall and extend through slots or apertures in the airbag assembly and are heat staked or otherwise deformed to attach the components.

Unfortunately, the provision of ribs or other structures for heat staking directly to the substrate of the instrument panel can result in exterior surface appearance defects during molding. Similarly, the pre-weakening of the deployment door's seam can cause potential surface appearance defects, either before or after the scoring procedure. The characteristics of the seam may also change over a long period of time due to exposure to environmental conditions such as UV rays, other light rays, heating or other temperature changes. Finally, the heat stakes represent an additional structure which must be controlled for flying parts during airbag deployment.

Accordingly, there exists a need to provide an inflatable restraint apparatus and airbag assembly for a motor vehicle which overcomes the above-noted drawbacks of using a heat staking operation to connect structural components and which reduces or eliminates the need for aggressive pre-weakening of the seam defining the deployment door in the interior panel.

BRIEF SUMMARY OF THE INVENTION

The present invention provides an airbag assembly for a motor vehicle which does not require any heat stakes and permits a deployment door to be formed in the interior panel without the need for scoring or other pre-weakening thereof. The airbag assembly is supported behind an interior panel defining a substrate and a deployment door. The airbag assembly generally comprises an airbag module having an airbag structured for deployment through the deployment door of the interior panel. An airbag chute defines an interior space sized to permit passage of the airbag therethrough. The airbag chute is constructed of plastic and includes a substrate facing surface and a module facing surface. A door assembly includes a metal door and a plastic door plate. The metal door includes a hinged portion and a door portion, while the door plate is attached to the door portion. The plastic door plate is positioned between the substrate and the door portion. The plastic door plate has a substrate facing surface. The substrate facing surfaces of the airbag chute and the plastic door plate are attached to the substrate. The substrate facing surface of the plastic door plate engages the substrate over a contact area to distribute a force imposed on the plastic door plate from the deployment of the airbag.

According to more detailed aspects, the plastic door plate is constructed of a thermoplastic, and is preferably constructed of a plastic compatible with the material of the substrate. The plastic door plate is constructed of a compliant material that distributes force therethrough. The door plate is preferably attached to the substrate through welding. Thus, the substrate facing surface of the plastic door plate may include a plurality of ribs which plasticize during welding. The plastic door plate and the substrate are bonded together to form an integral connection over the contact area. Specifically, when the plastic door plate is of a plastic compatible with the material of the substrate, the plastic door plate and substrate fuse together over the contact area to form an integral connection. The contact area is preferably at least 23% of the substrate facing surface of the plastic door plate, and more preferably at least 50% of the substrate facing surface.

According to still further aspects, the plastic door plate is preferably overmolded onto the door portion of the metal door. The plastic door plate may thus encapsulate the door portion of the metal door. The airbag chute is also preferably attached to the substrate through welding. The airbag chute and the door assembly may be attached to the substrate at the same time, and are preferably connected together prior to being attached to the substrate. The substrate may be scored to define a seam of the deployment door of the interior panel. However, by forming a large contact area between the airbag chute and the substrate of the interior panel allows the juncture of the two components to define the seam of the deployment door without any scoring or pre-weakening of the interior panel.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
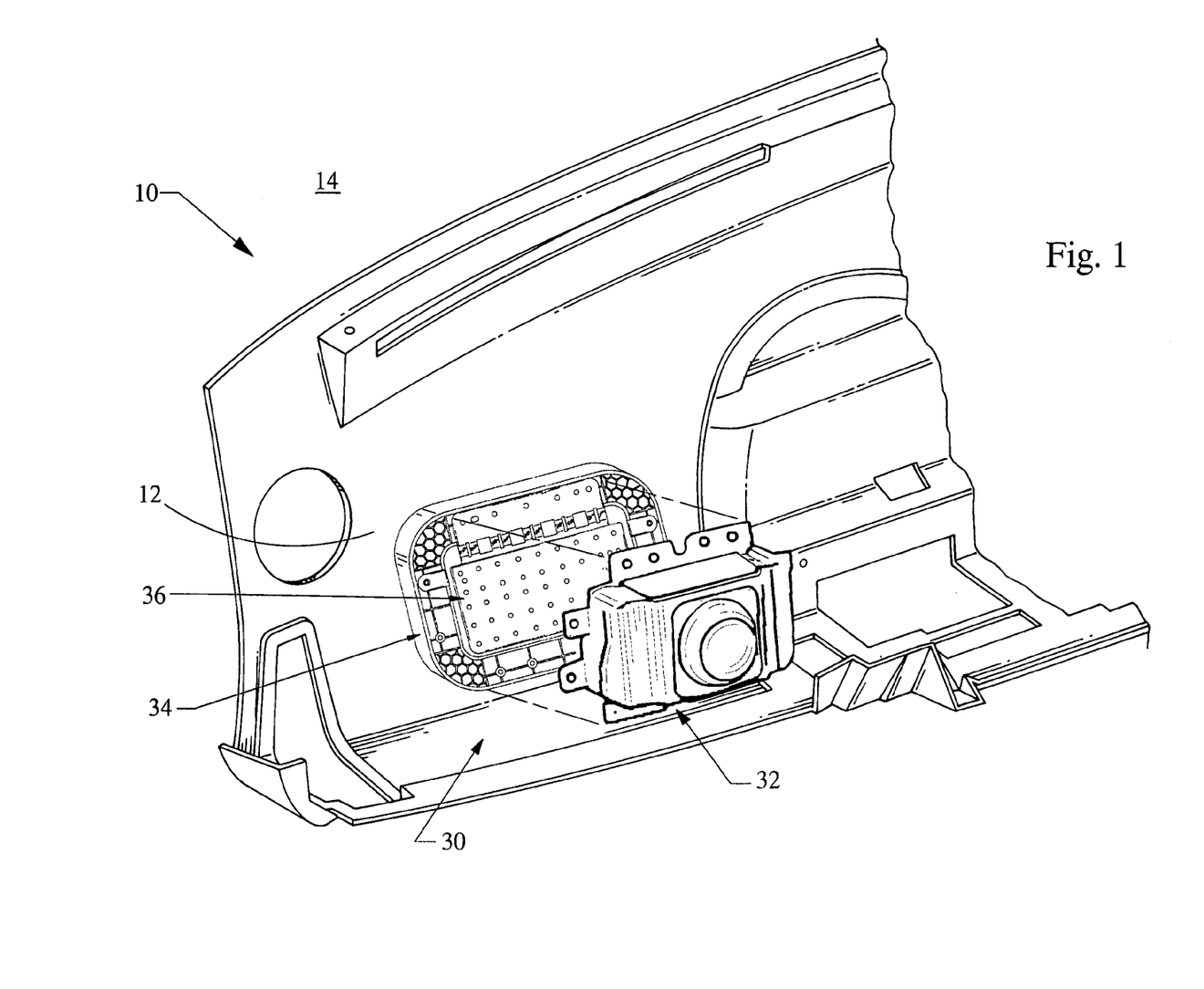
FIG. 1 is a perspective view of an instrument panel and airbag assembly constructed in accordance with the teachings of the present invention.

Turning now to the figures, FIG. 1 depicts a perspective view of an interior panel 10 and an airbag assembly 30 for a motor vehicle which eliminates the need for heat stakes and reduces the need for pre-weakening of the interior panel 10 for clean deployment of an inflatable restraint. The interior panel 10 has been depicted as an instrument panel having a substrate 12 defining an interior side of the panel 10 to which the airbag assembly 30 is mounted. The airbag assembly 30 includes an airbag module 32 having an airbag 40 (FIG. 7) which is deployed through a deployment door 18 (FIG. 7) formed in the interior panel 10 and into the interior compartment 14 of the vehicle. In addition to the airbag module 32, the airbag assembly generally includes an airbag chute 34 and a door assembly 36. The door assembly 36 is attached to the airbag chute 34, and likewise the airbag module 32 is attached to the airbag chute 34.

Figure 2:
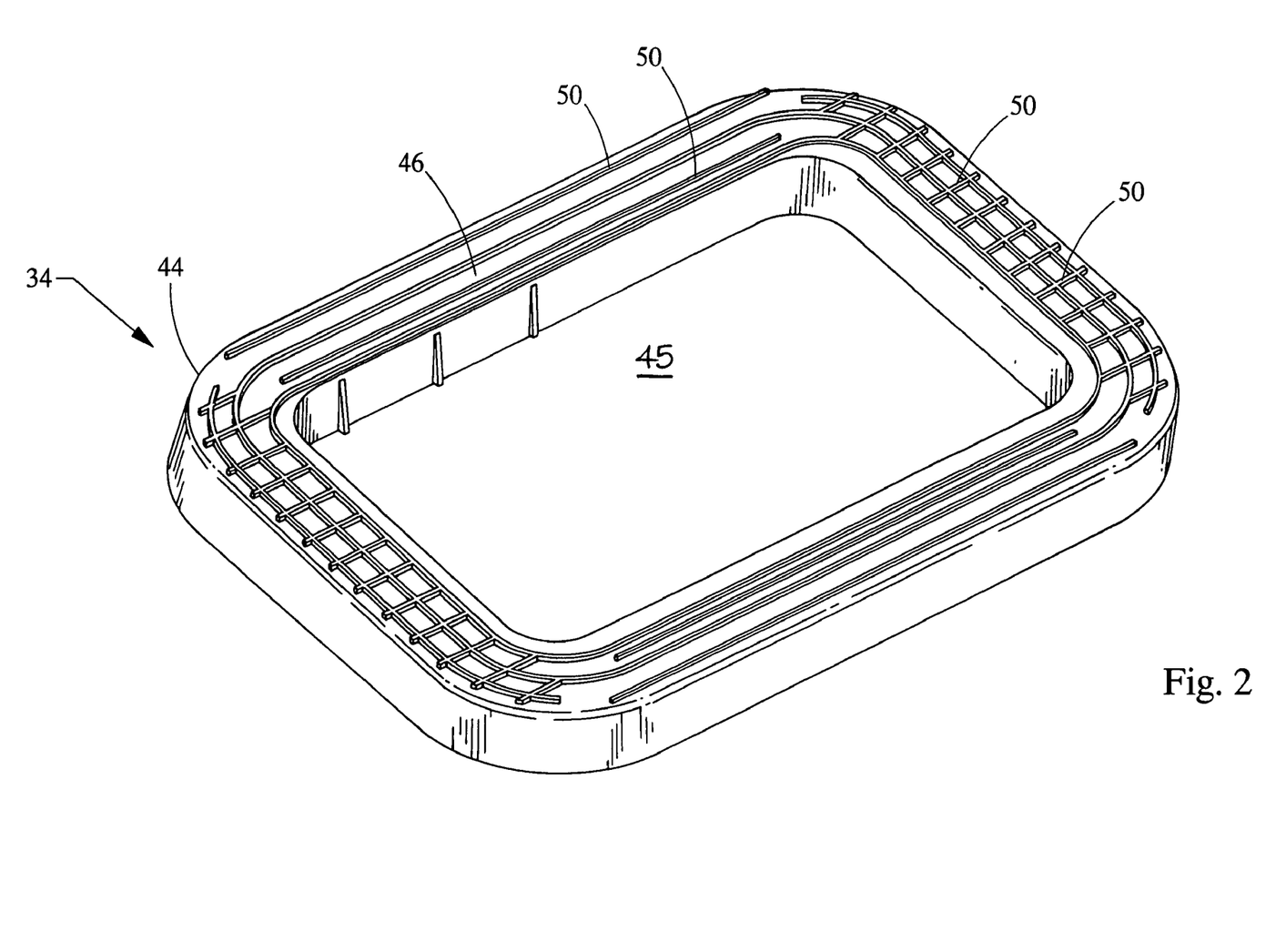
FIGS. 2 and 3 are perspective views, taken from the top and bottom respectively, of an airbag chute forming a portion of the airbag assembly depicted in FIG. 1.
Figure 3:
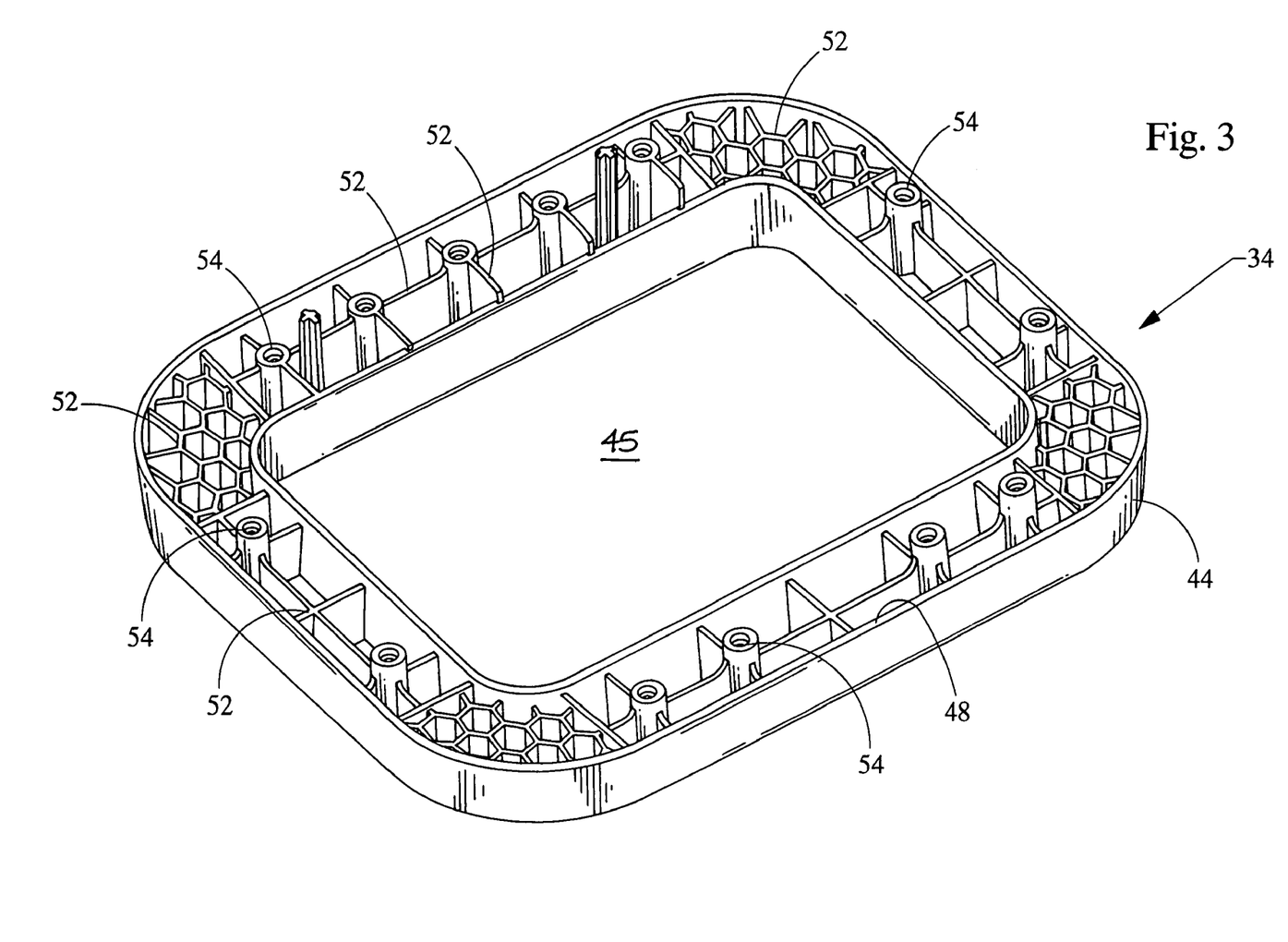

Turning now to FIGS. 2 and 3, the airbag chute 34 generally includes an annular body 44 defining an interior space 45 through which the airbag is deployed. The annular body 44 generally includes a substrate facing surface 46 and a module facing surface 48. The substrate facing surface 46 includes a plurality of ribs 50 which are used to attach the airbag chute 34 to the substrate 12. Some of the ribs 50 may extend completely around the annular body 44 as shown. The ribs 50 are used in welding the airbag chute 34 to the substrate 12, preferably by vibration welding, as will be described later herein, although other plastic welding techniques or adhesives may be employed.

The module facing surface 48 of the airbag chute 34 includes a plurality of support ribs 52 which may be formed in various supporting shapes such as the honeycomb shape shown in the corners of the body 44 or the T-shape structure shown in the longitudinal portions of the body 44. A plurality of bosses 54 are also defined, preferably including pre-formed holes, permitting attachment of both the door assembly 36 and the airbag module 32 to airbag chute 34, as best seen in FIG. 1. For example, rivets or screws may be used to connect the components 32, 34, 36, although other well known mechanical fastening means or welding means or adhesive means may be employed.

Figure 4:
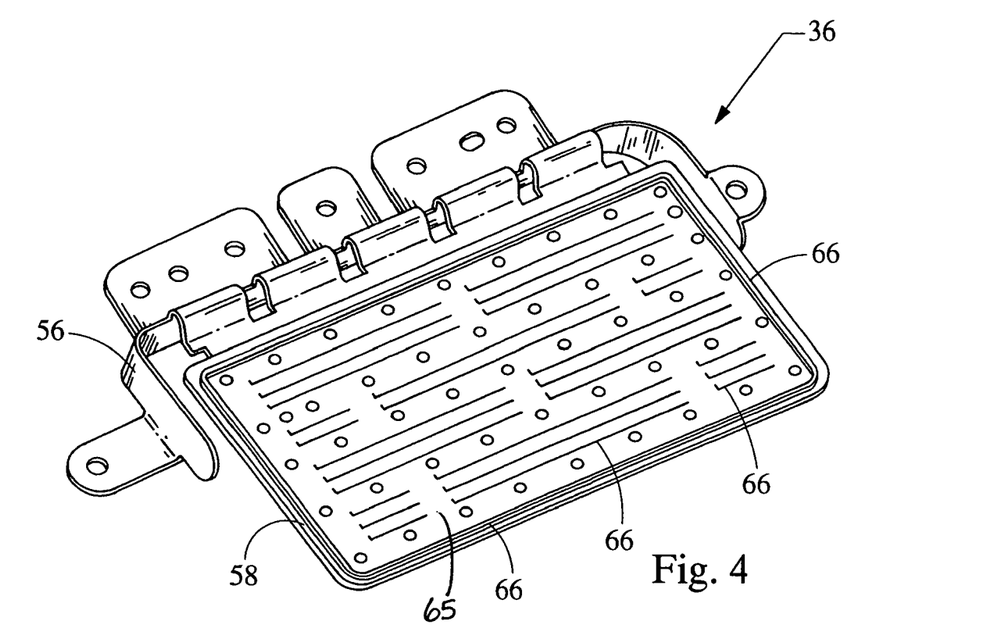
FIG. 4 is a perspective view of a metal door and plastic door plate forming a portion of the airbag assembly depicted in FIG. 1.
Figure 5:
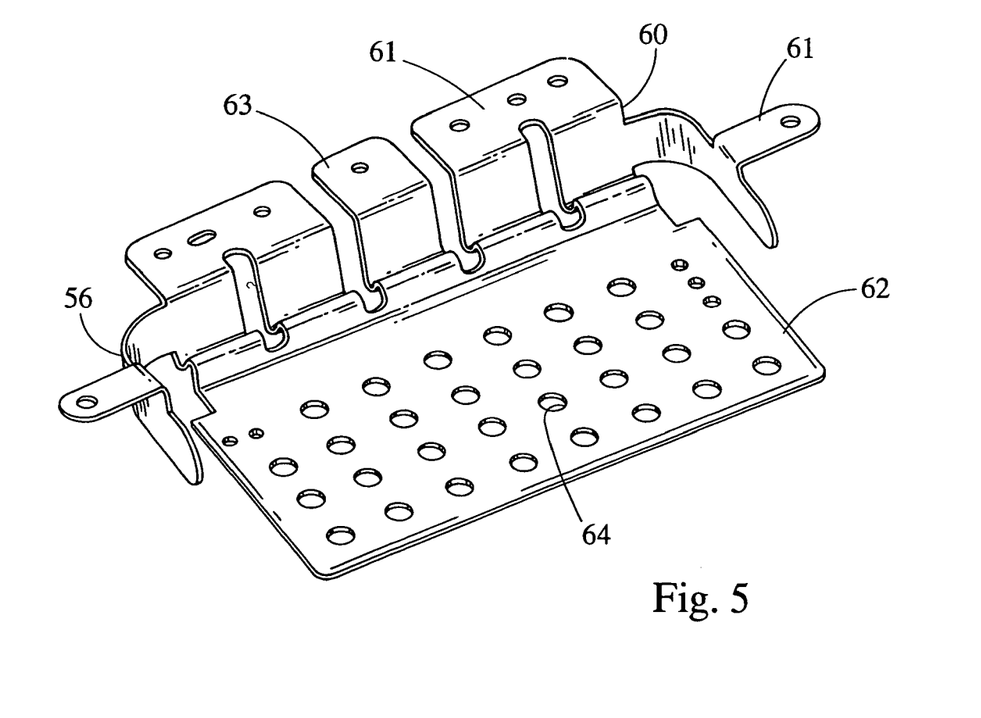
FIG. 5 is a perspective view of the metal door forming a portion of the airbag assembly depicted in FIG. 1.

Turning now to FIGS. 4 and 5, the door assembly 36 generally includes a metal door 56 and a plastic door plate 58. As shown in FIG. 5, the metal door 56 generally includes a hinge portion 60 and a door portion 62. The hinge portion 60 is used to attach the door assembly 36 to the airbag chute 34 by way of one or more attachment flanges 61. The hinge portion 60 also transitions from the flanges 61 to the door portion 62 by forming the metal into a hinge 63 through shaping or other techniques. It will be recognized by those skilled in the art that various formations of the hinge 63 may be employed.

The door portion 62 includes a plurality of apertures 64 therein, and is structured to be overmolded with a plastic material to form the plastic door plate 58. The plastic door plate 58 is at least positioned between the metal door portion 62 of the metal door 56 and the substrate 12, but is preferably overmolded onto the door portion 62 such that the plastic door plate 58 encapsulates the door portion 62 on both the substrate facing side and the module facing side. The plastic door plate 58 generally includes a substrate facing surface 65 having a plurality of ribs 66 defined therein. The ribs 66 may take various forms, but preferably extend over a majority of the substrate facing area 65, and may include an annular rib 66 extending around the periphery thereof.

Figure 6:
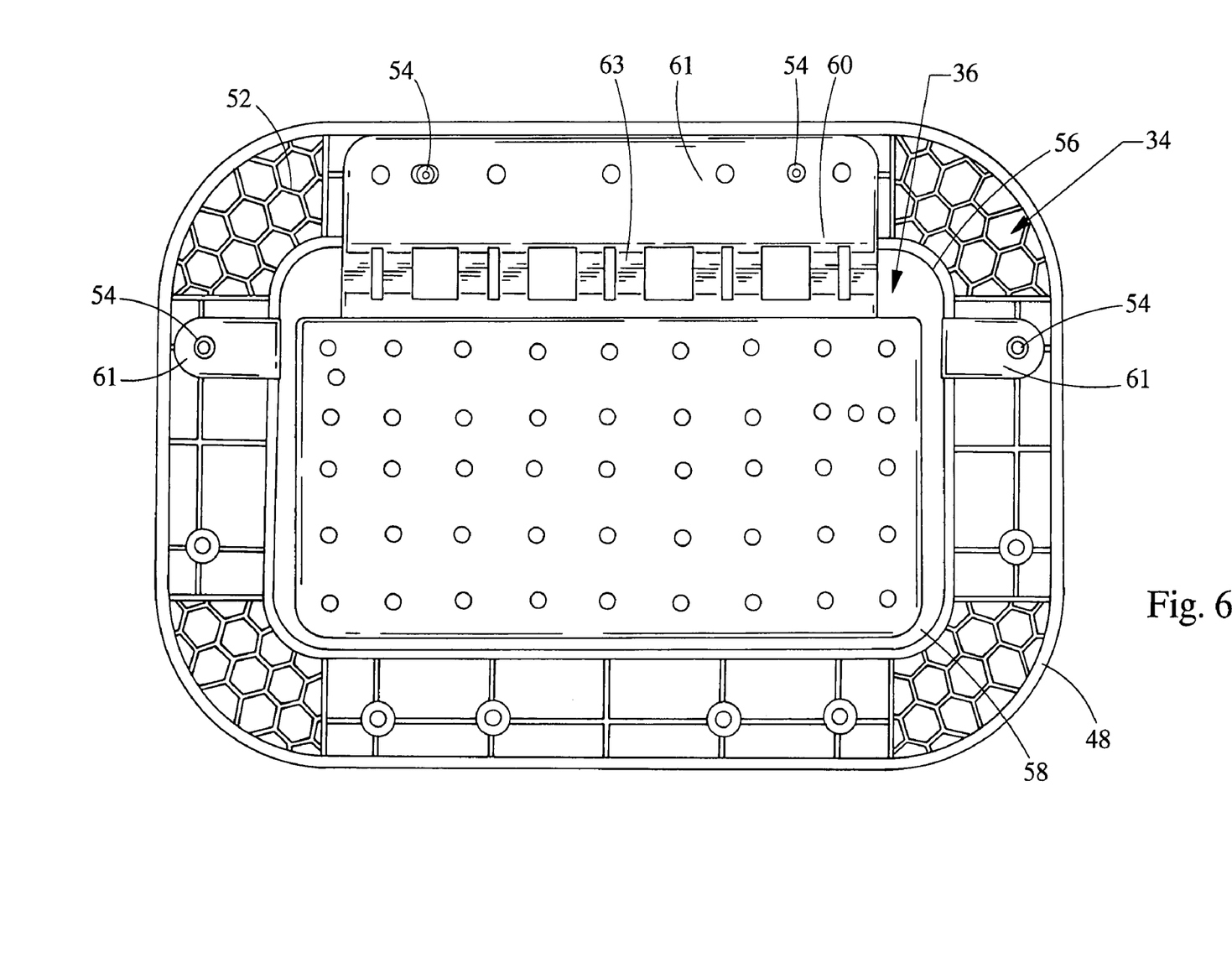
FIG. 6 is a perspective view, taken from the bottom, of the metal door and plastic door plate of FIG. 4 shown attached to the airbag chute depicted in FIGS. 2-3.

The assembling process of the airbag system 30 to the interior panel 10 will now be described with reference to FIGS. 6-8. Preferably, the door assembly 36 is attached to the airbag chute 34 prior to attaching these components to the interior panel 10 simultaneously, although it will be recognized that the door assembly 36 and chute 34 may be separately attached to the interior panel 10. The attachment flanges 61 of the metal door 56 have apertures which are used to attach to the bosses 54 on a module facing surface 48 of the airbag chute 34. Although mechanical fasteners may be used, the bosses 54 may also be heat staked or otherwise deformed to connect the door assembly 36 to the airbag chute 34.

As previously noted, both the substrate facing surface 46 of the airbag chute 34 as well as the substrate facing surface 65 of the plastic door plate 58 include a plurality of ribs 50, 66 which are used in attaching the airbag chute 34 and door assembly 36 to the substrate 12 of the interior panel 10, preferably by a welding technique, and most preferably vibration welding although other welding techniques or adhesives may be used. The ribs 50, 66 focus the energy of the welding technique (i.e. vibration) thereby generating heat and plasticizing the ribs 50, 66 as well as plasticizing the adjacent substrate facing surface 46, 66 in the area proximate the ribs 50, 66 and the substrate 12 of the interior panel 10. In this way, the airbag chute 34, the plastic door plate 58 and the substrate 12 are bonded together to form an integral connection over contact areas 70, 72 (FIG. 8). The contact areas 70, 72 preferably comprise a majority of and nearly all of the substrate facing surfaces 46, 65 of the airbag chute 34 and plastic door plate 65, respectively. The contact area 72 is preferably at least 23% of the substrate facing surface 65 of the plastic door plate 58, and more preferably at least 50% of the substrate facing surface 65 of the plastic door plate 58.

Figure 7:
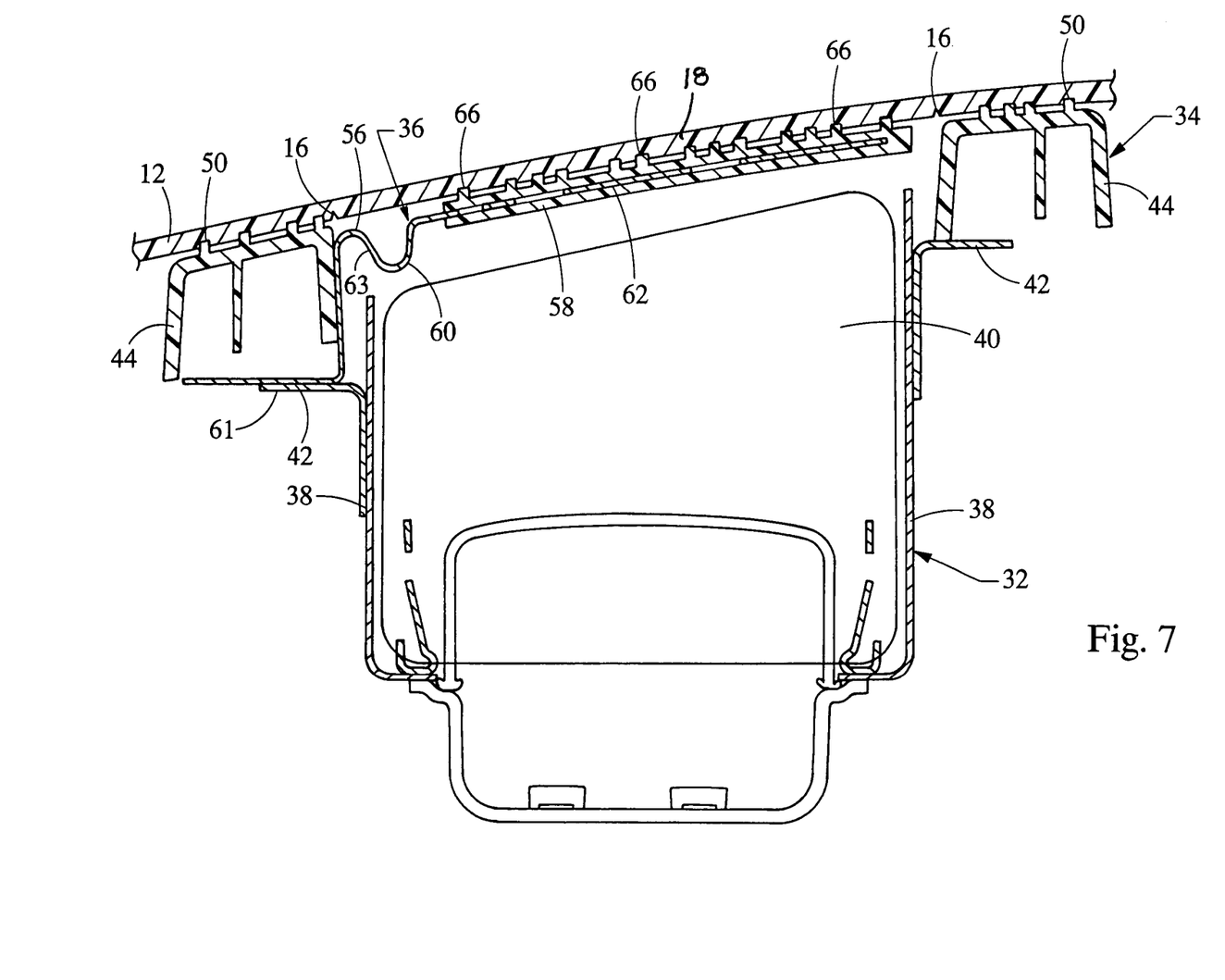
FIG. 7 is cross-sectional view of the instrument panel and airbag assembly depicted in FIG. 1.
Figure 8:
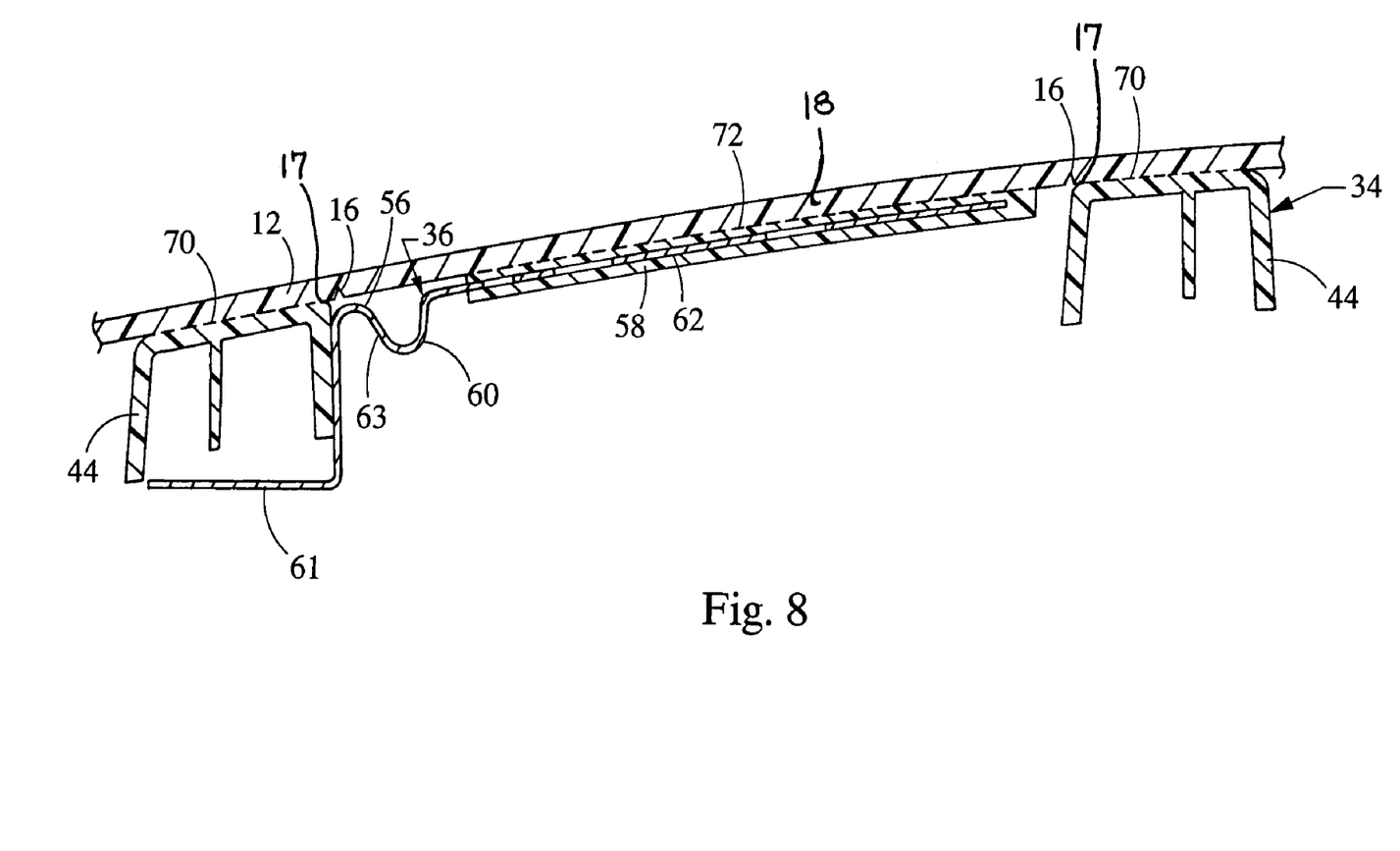
FIG. 8 is an enlarged cross-sectional view of the instrument panel and airbag assembly depicted in FIG. 7.

In FIG. 7, the airbag chute 34 and door assembly 36 are shown positioned against the substrate 12 prior to the welding technique. The assembled structure has been shown in FIG. 8 where the ribs 50, 66 have been plasticized as well as the surface areas of the interior panel 12, airbag chute 34 and plastic door plate 58 which are adjacent the ribs 50, 66. It can therefore be seen that the airbag chute 34 and plastic door plate 58 are bonded to the substrate 12 to form an integral connection over contact areas 70, 72 respectively, through the fusing together of the plastic materials.

The plastic door plate 58, as well as the airbag chute 34, are preferably constructed of a thermoplastic material, and most preferably thermoplastic elastomers (TPE) or thermoplastic vulcanized (TPV). The plastic material of these structures preferably provide ductility at cold temperatures, weld-ability to the substrate 12 which is typically made of a thermoplastic such as polypropylene, and elongation at a wide range of temperatures. The plastic door plate 58 and airbag chute 34 are preferably constructed of a plastic that is compatible with the material of the substrate 12, meaning the plastic materials can bond and thereby provide weldability.

The material of the plastic door plate 58 is also preferably a compliant material which distributes force therethrough. As airbag deployments vary from airbag to airbag, and the exact portion of the door assembly 34 which is struck by the airbag 40 may vary, the plastic door plate 58 can be used to distribute the force over the contact area 72 to provide a more evenly spread force on the deployment door 18 (FIG. 8) formed in the interior panel 10. That is, unlike prior assemblies which have focused the energy on the deployment door 18, the plastic door plate 58 distributes the force over a wider area of the deployment door 18, thereby providing cleaner deployment of the airbag 40.

Accordingly, the deployment door 18, which may be defined by a pre-weakened line 16 (such as by scoring) does not require as aggressive of a pre-weakening to insure dependable and clean break-away of the deployment door 18 from the remainder of interior panel 10. Even further, the pre-weakened seam 16 may be completely eliminated, and the juncture 17 of the substrate 12 and airbag chute 34 (i.e. the interior edge of the airbag chute contact area 70) may be used to define the seam 17 and hence the deployment door 18. Stated another way, the strong bond and integral connection over the contact area 70 permits the elimination of the pre-weakened seam 16. Further, the better force distribution through the plastic door plate 58 of the door assembly 36 permits spreading out of the deployment force over the entire contact area 72, which in conjunction with the tear-away seam 17 permits clean deployment of the airbag through the deployment door 18 without risking any surface appearance defects on the class A surface of the interior panel 10 through troublesome scoring.

Once the airbag chute 34 and door assembly 36 have been attached to the substrate 12 of the interior panel 10 through the welding technique described above, the airbag module 32 may be attached to the airbag chute 34 through its housing 38 and flanges 42, preferably by way of threaded fasteners, as best seen in FIGS. 1 and 7.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An airbag assembly for a motor vehicle having an interior panel defining a substrate and a deployment door, the airbag assembly comprising:
   an airbag module having an airbag structured for deployment through the deployment door of the interior panel;
   an airbag chute defining an interior space sized to permit passage of the airbag therethrough, the airbag chute including a substrate facing surface and a module facing surface, the airbag chute being constructed of plastic;
   a door assembly including a metal door and a plastic door plate, the metal door including a hinge portion and a door portion, the plastic door plate being attached to the door portion and positioned between the substrate and the door portion, the plastic door plate having a substrate facing surface;
   the substrate facing surfaces of the airbag chute and the plastic door plate being attached to the substrate;
   the substrate facing surface of the plastic door plate engaging the substrate over a contact area to distribute a force imposed on the plastic door plate from the deployment of the airbag.

2. The airbag assembly of claim 1, wherein the plastic door plate is constructed of a thermoplastic.

3. The airbag assembly of claim 1, wherein the substrate is constructed of a material that is compatible with the plastic door plate.

4. The airbag assembly of claim 1, wherein the plastic door plate is constructed of a compliant material that distributes force therethrough.

5. The airbag assembly of claim 1, wherein the plastic door plate is attached to the substrate through welding.

6. The airbag assembly of claim 5, wherein the substrate facing surface of the plastic door plate includes a plurality of ribs which focus the energy of welding and plasticize during welding.

7. The airbag assembly of claim 1, wherein the plastic door plate and the substrate are bonded together to form an integral connection over the contact area.

8. The airbag assembly of claim 7, wherein the plastic door plate is constructed of a plastic compatible with the material of the substrate, the plastic door plate and substrate fusing together over the contact area to form the integral connection.

9. The airbag assembly of claim 1, wherein the contact area is at least 23 percent of the substrate facing surface of the plastic door plate.

10. The airbag assembly of claim 1, wherein the contact area is at least 50 percent of the substrate facing surface of the plastic door plate.

11. The airbag assembly of claim 1, wherein the plastic door plate is overmolded into the door portion of the metal door.

12. The airbag assembly of claim 11, wherein the plastic door plate encapsulates the door portion of the metal door.

13. The airbag assembly of claim 1, wherein the airbag chute is attached to the substrate through welding.

14. The airbag assembly of claim 1, wherein the substrate is scored to define a seam of the deployment door of the interior panel.

15. The airbag assembly of claim 1, wherein the substrate has substantially uniform cohesive strength proximate to the deployment door of the interior panel.

16. A method of assembling an airbag deployment apparatus for a motor vehicle comprising the steps of:
   providing an interior panel having a substrate and a deployment door;
   Providing an airbag module having an airbag structured for deployment through the deployment door of the interior panel;
   providing an airbag chute defining an interior space sized to permit passage of the airbag therethrough, the airbag chute including a substrate facing surface and a module facing surface, the airbag chute being constructed of plastic;
   providing a metal door including a hinge portion and a door portion;
   producing a door assembly by substantially encapsulating the door portion with a plastic door plate;
   simultaneously attaching the door assembly and the airbag chute to the substrate; and
   attaching the airbag module to the airbag chute.

17. The method of claim 16, wherein the airbag chute and the door assembly are connected together prior to being simultaneously attached to the substrate.

18. The method of claim 17, wherein the airbag chute and the plastic door plate are simultaneously attached to the substrate by welding.

* * * * *